United States Patent
Herman et al.

(10) Patent No.: US 8,196,381 B2
(45) Date of Patent: Jun. 12, 2012

(54) CROP LIFTER PANS

(75) Inventors: Ardon Herman, Minnewaukan, ND (US); Dave Dietrich, Assiniboia (CA)

(73) Assignee: Dave Dietrich, Assiniboia, SK (CA)

( * ) Notice: Subject to any disclaimer, the term of this patent is extended or adjusted under 35 U.S.C. 154(b) by 0 days.

(21) Appl. No.: 12/805,300

(22) Filed: Jul. 22, 2010

(65) Prior Publication Data

US 2011/0138764 A1   Jun. 16, 2011

Related U.S. Application Data

(63) Continuation-in-part of application No. 12/320,601, filed on Jan. 29, 2009, now abandoned.

(60) Provisional application No. 61/063,451, filed on Feb. 4, 2008.

(30) Foreign Application Priority Data

Oct. 2, 2008  (CA) ..................................... 2640269

(51) Int. Cl.
*A01D 34/00* (2006.01)
(52) U.S. Cl. ................. 56/312; 56/207; 56/313
(58) Field of Classification Search ............... 56/207, 56/119, 298, 312, 313, 220, 307, 126, 314
See application file for complete search history.

(56) References Cited

U.S. PATENT DOCUMENTS

| | | | |
|---|---|---|---|
| RE2,594 E | 5/1867 | Wheeler, Jr. | |
| 325,109 A * | 8/1885 | Naff | 56/127 |
| 700,029 A | 5/1902 | Gatermann | |
| 791,022 A | 5/1905 | Gaterman | |
| 911,017 A | 1/1909 | Kouns | |
| 1,095,914 A * | 5/1914 | Kellogg | 56/207 |
| 1,186,832 A | 6/1916 | Pridgen | |
| 1,258,740 A | 3/1918 | Blocki | |
| 1,368,014 A | 2/1921 | Bauert et al. | |
| 2,008,895 A | 7/1935 | Braasch et al. | |
| 2,099,471 A | 11/1937 | Edgington | |
| 2,134,239 A * | 10/1938 | Sells | 56/220 |
| 2,187,438 A | 1/1940 | Wilcox | |
| 2,214,965 A | 9/1940 | Love | |
| 2,576,122 A | 11/1951 | Kenison | |
| 2,577,324 A | 12/1951 | Goesch | |
| 2,734,332 A | 2/1956 | Fisher | |
| 2,892,298 A | 6/1959 | Chaney | |
| 2,960,814 A | 11/1960 | Babcock | |
| 3,163,975 A | 1/1965 | Lightsey | |
| 3,579,967 A | 5/1971 | Schumacher | |
| 3,729,909 A | 5/1973 | Gray et al. | |
| 3,788,051 A | 1/1974 | Richardson | |
| 3,834,139 A * | 9/1974 | Schumacher et al. | 56/313 |

(Continued)

*Primary Examiner* — Arpad Fabian-Kovacs
(74) *Attorney, Agent, or Firm* — Nixon & Vanderhye P.C.

(57) ABSTRACT

A seed pan apparatus for attachment to a cutting header having a knife and cooperating knife guards mounted along a lower front edge thereof includes a seed pan adapted at a front portion thereof for attachment to a guard finger such that when attached, the seed pan extends upward and rearward from a front portion of the seed pan forward of the guard finger over the guard finger and knife to a rear end thereof located rearward of the knife. Side walls extend upward from side edges of the seed pan, and side edges of the seed pan diverge from a front end to the rear end. The seed pan is configured such that when the seed pan is attached to the guard finger, side edges of the seed pan are located between the attached guard finger and an adjacent guard finger on each side.

18 Claims, 4 Drawing Sheets

U.S. PATENT DOCUMENTS

| | | | |
|---|---|---|---|
| 3,844,094 A | 10/1974 | Janzen | |
| 3,913,306 A | 10/1975 | Schumacher et al. | |
| 3,995,413 A | 12/1976 | Lynch | |
| 4,120,138 A | 10/1978 | Schumacher | |
| 4,255,920 A | 3/1981 | Janzen | |
| 4,358,921 A | 11/1982 | Pustejovsky | |
| 5,105,610 A | 4/1992 | Britten | |
| 5,806,292 A | 9/1998 | Luecke | |
| 5,809,759 A | 9/1998 | Zyla et al. | |
| 5,943,849 A | 8/1999 | Billheimer | |
| 6,032,445 A | 3/2000 | Heintzman | |
| 6,052,977 A | 4/2000 | Goering | |
| 6,094,898 A | 8/2000 | Goering et al. | |
| 6,244,026 B1 | 6/2001 | Minnihan et al. | |
| 6,564,536 B1 | 5/2003 | Hoffer | |
| 6,691,499 B2 | 2/2004 | Schumacher et al. | |
| 6,708,477 B2 | 3/2004 | Schumacher et al. | |
| 7,316,104 B2 | 1/2008 | Melano | |
| 2009/0183483 A1 | 7/2009 | Herman et al. | |

\* cited by examiner

CROP LIFTER PANS

This application is a Continuation-In-Part of Application Ser. No. 12/320,601, filed Jan. 29, 2009 now abandoned, which claims benefit of Provisional Application Ser. No. 61/063,451, filed Feb. 4, 2008, and claims priority on CA 2,640,269, filed Oct. 2, 2006, the entire contents of which are hereby incorporated herein by reference in this application.

This invention is in the field of agricultural harvesting equipment and in particular equipment for cutting crops.

BACKGROUND

For various reasons crops sometimes are lying so close to the ground that it is difficult to cut them with a conventional harvest header. Some crops are inherently short, while others may be taller, but are prone to fall down when they reach maturity.

Typically the knife on cutting headers comprises a knife bar extending along the front lower edge of the header, with a plurality of triangular knife sections attached to the bar such that the apex of the triangle extends forward from the bar. The exposed side edges of the knife sections are sharpened. Guards are attached to the front lower edge of the header and serve to protect the knife sections from breakage when contacting stones and like obstructions. The guards comprise pointed guard fingers extending forward, and the knife moves back and forth along the edge of the header in a slot cut laterally through the guard fingers. In addition to protecting the knife, the guard fingers also enable the knife sections to cut the crop. As the knife section moves back and forth it pushes crop against the sides of those portions of the guard finger that are above and below the slot, shearing the crop stalks.

A conventional knife is a few inches above the ground when the header is in its lowest position, such that very short or downed crop material will pass under the knife and be lost. Many different kinds of "crop lifters", as they have come to be known have been developed over the last century and more. Typically these crop lifters are attached to the header and/or the forward extending point of the guard finger, and provide an arm of various designs that rides along the ground ahead of the knife. A lifting finger extends at a shallow angle from the front of the arm back and over the knife. As the header moves down the field, the arm rides along the ground and under the downed crop stalks, which then are lifted and pass over the lifting finger to the knife, where they are cut and continue moving onto the header from where they can be passed to the harvester, swather table, or the like.

U.S. Pat. Nos. 700,029 and 791,022 to Gatermann disclose such a crop lifter that is pivotally attached to the header so as to be able to move up and down to follow the ground. U.S. Pat. No. 4,120,138 to Schumacher illustrates a crop lifter that is fixed to the header instead of pivoting, but is made of spring steel so that same may move up and down to follow the ground.

Much loss often occurs in straight cut harvesting of crops such as dry beans, peas, and lentils due to pods shattering or pods, or parts of pods that are below the cutter bar. The lifting fingers of the prior art are narrow fingers that are designed to lift stalks above the knife so that they may be cut, and so that the seed pods attached to the stalks may be carried onto the header and retained. The narrow fingers however allow pods to hang down on each side of the rod as the stalk moves rearward along the finger, such that some pods are below the knife when the stalk is cut, and therefore drop to the ground and are lost.

As well, seed pods often shatter when contacted by the harvesting equipment before they are on the header, and the shattered pods spill their seeds to fall on the ground. The crop lifters are moving relatively slowly at the speed of the harvester, perhaps five miles per hour, but the knife is moving rapidly back and forth in the guards. Thus most of the shattering loss occurs in the area generally just above the knife when the stalk is contacted by the rapidly moving knife. Seeds fall from the shattered pods down through the knife to the ground. While this problem of shattering seed pods and heads is more severe in some crops than others, there is generally at least some shattering loss in any crop.

It is therefore known to attach wide seed pans to the cutting header, as disclosed in U.S. Pat. Nos. 4,255,920 to Janzen, 5,105,610 to Britten, and 6,564,536 to Hoffer. These pans extend forward from the knife to a pointed front end, with parallel edges of the pans separated by a slot along which crop plants move to the knife. The seed pans cover part of the knife, such that plants are cut only by that portion of the knife that is exposed at the end of the slots. These pans are also referred to as divider pans or guide pans and they divide and guide crop plants to the exposed portions of the knife. Seeds falling from the plants also fall onto the wide pans and are swept onto the cutting header.

SUMMARY OF THE INVENTION

It is an object of the present invention to provide a seed pan apparatus for a cutting header that overcomes problems in the prior art.

In a first embodiment the present invention provides a seed pan apparatus for attachment to a cutting header having a knife and cooperating knife guards mounted along a lower front edge thereof. The knife guards include guard fingers extending forward from the knife, and the apparatus comprises a seed pan adapted at a pointed front portion thereof for attachment to a guard finger such that when attached to the guard finger, the seed pan extends upward and rearward from a front portion of the seed pan forward of the guard finger over the guard finger and knife to a rear end thereof located rearward of the knife and above the knife. Side walls extend upward from side edges of the seed pan, and when the seed pan is attached to the guard finger, right and left side edges of the seed pan diverge from a front end thereof to the rear end thereof such that the rear end of the seed pan is wider than the front end thereof. The seed pan is configured such that when the seed pan is attached to the guard finger, side edges of the seed pan are located between the attached guard finger and an adjacent guard finger on each side.

In a second embodiment the present invention provides a cutting header apparatus comprising a knife and cooperating knife guards mounted along a lower front edge of a cutting header, the knife guards including guard fingers extending forward from the knife. A seed pan is attached at a pointed front portion thereof to a guard finger such that the seed pan extends upward and rearward from a front portion of the seed pan forward of the guard finger over the guard finger and knife to a rear end thereof located rearward of the knife and above the knife. Side walls extend upward from side edges of the seed pan, and right and left side edges of the seed pan diverge from a front end thereof to the rear end thereof such that the rear end of the seed pan is wider than the front end thereof. Right and left side edges of the seed pan are located between the attached guard finger and corresponding adjacent guard finger on each side of the attached guard finger.

The seed pans catch a significant proportion of seeds that fall from shattered pod and heads. The pans are widest generally above the cutting knife where shattering is most likely to occur. Crop stalks are bent slightly to each side by the wedge shaped pans, but are still effectively exposed to the knife sections and guards so same can be cut. This lateral movement also helps to raise pods attached to the stalks to a level where same will be above the knife and so increase the chances that the pod will pass onto the header.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
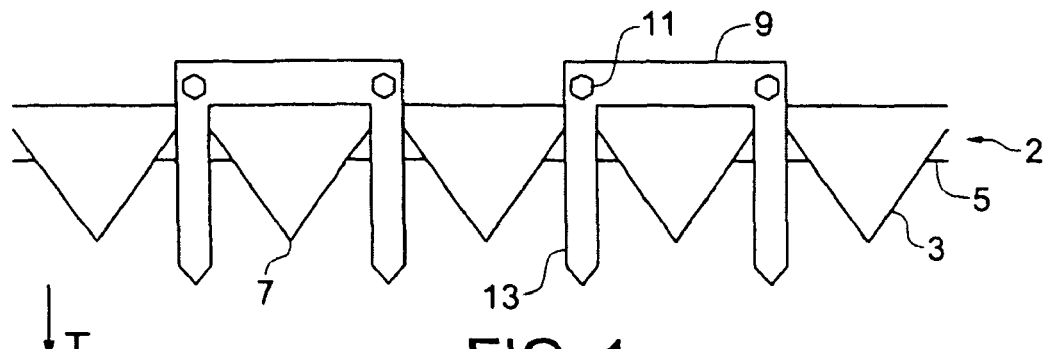
FIG. 1 is a schematic bottom view of the cutting mechanism of a typical cutting header.

A typical cutting header comprises a knife extending along the front lower edge of the header, which is moved along a field in an operating travel direction T. The knife 2 comprises, as schematically illustrated in the bottom view of FIG. 1, a plurality of triangular knife sections 3 attached to a knife bar 5 such that the apex 7 of the triangle extends forward from the bar 5. Knife guards 9 are attached to the front lower edge of the header with guard bolts 11 and serve to protect the knife sections 3 from breakage when contacting stones and like obstructions. The guards 9 comprise pointed guard fingers 13 extending forward.

Figure 2:
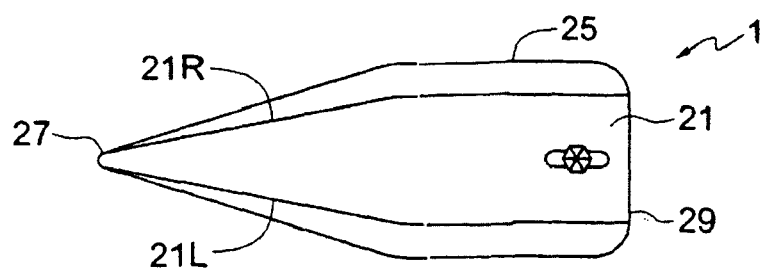
FIG. 2 is a top view of an embodiment of the seed pan apparatus of the present invention.
Figure 3:
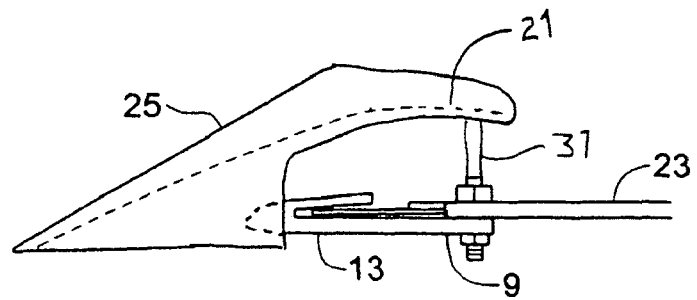
FIG. 3 is a schematic side view of the seed pan apparatus of FIG. 2 mounted on a cutting header.

FIGS. 2 and 3 illustrate a seed pan apparatus 1 for attachment to a typical cutting header such as illustrated in FIG. 1. The seed pan apparatus 1 comprises a seed pan 21 adapted at a front portion thereof for attachment to a guard finger 13 on the cutting header 23 such that when attached to the guard finger 13, the seed pan 21 extends upward and rearward from a pointed front portion of the guard finger 13 over the guard finger 13 and knife 2 to a rear end thereof located rearward of and above the knife 2. Side walls 25 extend upward from side edges of the seed pan 21. Right and left side edges 21R, 21L of the seed pan 21 diverge from a front end 27 thereof to the rear end 29 thereof such that the rear end 29 of the seed pan 21 is wider than the front end 27 thereof.

In the apparatus 1 the front portion of the seed pan 21 is adapted to attach to a front end of a guard finger 13, and a rear portion of the seed pan 21 is adapted to be attached to a guard bolt 31 attaching a guard 9 to the cutting header 23. The guard bolt 13 in this embodiment extends above the cutting header 23 to support the rear portion of the seed pan 21 at a position above the header 23. Rather than being made to attach to existing guards 9, a whole new guard could be designed incorporating the seed pan 21 and guard finger 13 to replace the original guards 9.

Figure 4:
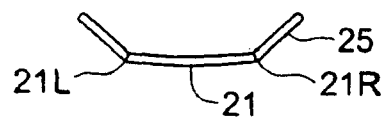
FIG. 4 is a schematic sectional view of the seed pan apparatus of FIG. 2.

Also in the illustrated apparatus 1 the front end 27 of the seed pan 21, when attached to the guard finger 13, is forward of a front end of a guard finger 13, and the side walls 25 slope upward and outward from the side edges 21R, 21L of the seed pan 21, as schematically illustrated in FIG. 4.

Figure 5:
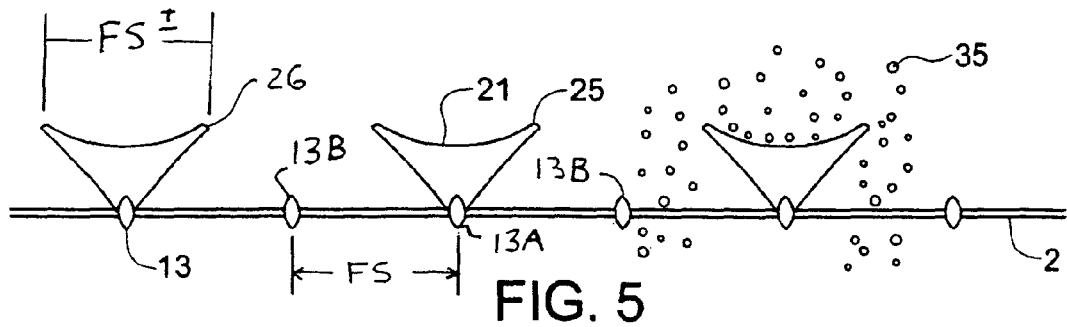
FIG. 5 is a schematic front view of a plurality of the seed pan apparatuses of FIG. 2 mounted on a cutting header, and showing seeds falling from shattered pods.

With a plurality of seed pan apparatuses 1 mounted on guard fingers of a header such as illustrates in FIG. 1, it can be seen that a considerable length of the knife 2 is covered by the seed pans 21 and side walls 25 of the apparatuses 1, as shown in the schematic front view of FIG. 5. A significant proportion of seeds 35 that drop from shattered pods thus fall onto the seed pans 21 instead of on to the ground.

Also as can be seen in FIG. 5, the width of the seed pan 21 is selected such that when the seed pan 21 is attached to the guard finger 13, side edges 26 of the seed pan 21 are located between the attached guard finger 13A and an adjacent guard finger 13B on each side. In the embodiment of FIG. 5, the guard fingers are spaced apart by a guard finger spacing FS and the seed pan 21 has a width at a widest portion thereof that is about the same as the guard finger spacing FS. FIG. 5 shows a plurality of seed pans 21 attached to alternate guard fingers 13A such that the knife can cut crop plants against the guard fingers 13A under the attached seed pans 21, and can cut crop plants against guard fingers 13B between the seed pans 21.

In contrast to prior art seed pans, the present seed pans 21 do not block any portions of the knife 2, but allow the knife to cut the plants along its full width by cutting under the attached seed pans 21. The seed pans 21 are oriented at an angle upward from the horizontal as shown in FIG. 3 so that the plants can be cut against the guard fingers 13. The front portion of the seed pan 21 in FIG. 3 is oriented at an angle of about 30 degrees upward from the horizontal.

Figure 6:
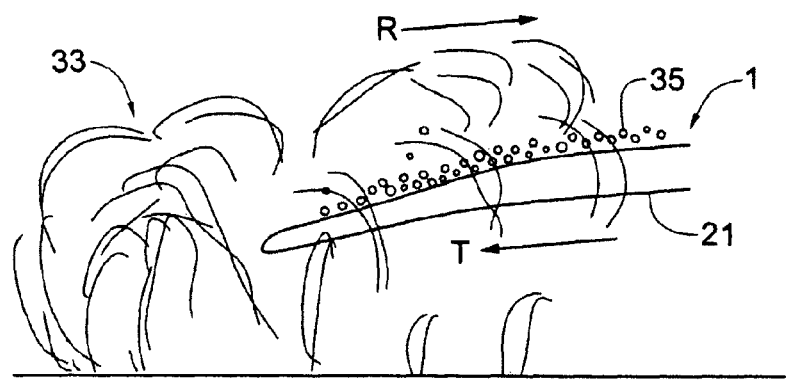
FIG. 6 is a schematic side view of a seed pan apparatus of FIG. 2 moving through a crop.
Figure 7:
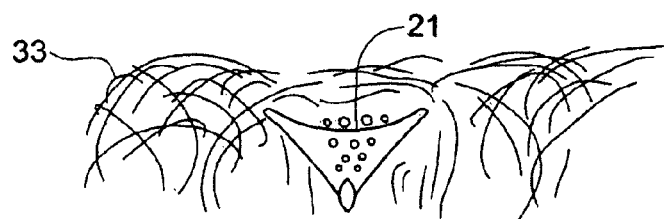
FIG. 7 is a schematic front view of a seed pan apparatus of FIG. 2 moving through a crop.

Plants of a typical bean or pea crop 33 are illustrated in FIGS. 6 and 7. Such plants typically include vine type stalks that are laying down and tangled, as opposed to a crop like wheat where the stalks are straighter and more upright. In such a crop, as the seed pan apparatus moves through the crop, the pointed front portion parts the plants 33 and the plants pass along the top of the apparatus 1 in a rearward direction R as the header is moved in direction T. Reels also typically engage the plants just in front of the knife and push the plants rearward along the top of the seed pan 21. The rearward moving material also carries the seeds 35 that landed on the seed pans 21 rearward and over the rear end 29 of the seed pans and onto the header where they are carried into the harvester and saved. Use of a pick up reel, with teeth raking through the crop plants, or an air reel blowing material rearward will enhance saving of the seeds.

The conventional narrow rod type lifting finger allows bean pods to hang down on each side of the rod such that pods are often not lifted high enough to be cut. The wider seed pan 21 of the present invention lifts and spreads the vines ahead of the knife, and thus draws the pods farther off the ground as it moves forward, compared to the conventional narrow lifting finger. The stalk passes not only up and over the narrow finger then down, but up and then across the wide portion of the pan and then down, such that hanging pods are raised higher and so more will be above the knife and be cut and saved.

It will be noted in FIG. 6, the front portion of the seed pan 21 is schematically shown as oriented at an angle of about 15 degrees upward from the horizontal, which it is contemplated would be the minimum upward angle to accomplish the purposes of the invention.

Tests in pinto beans comparing the seed pans of the present invention to a popular conventional crop lifter on a John Deere™ flex header with an air reel showed the seed pans reduced losses by 1.7 bu. per acre, a significant saving. The seed pans were 4½ inches wide mounted on alternate guard fingers where the finger spacing was 4½ inches, such that the seed pans were on 9 inch centers.

Figure 8:
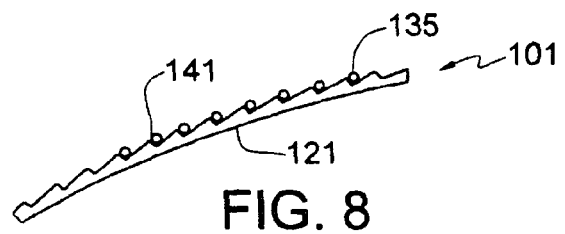
FIG. 8 is a schematic sectional side view of an alternate seed pan apparatus comprising steps.

It is contemplated that in some conditions and crops it may be advantageous to provide a series of steps in the seed pan. FIG. 8 illustrates an alternate seed pan apparatus 101 where the seed pan 121 includes a series of steps 141 in the seed pan 121. Seeds 135 will be held on the steps 141 instead of rolling down the incline of the seed pan 121 where the crop plants are thin for example and therefore little material is moving to carry the seeds rearward onto the cutting header. The seed pan 121 is also somewhat vertically curved, so that the front portion thereof is oriented a steeper angle than the rear portion to provide increased plant lift at the front of the seed pan 121.

Figure 9:
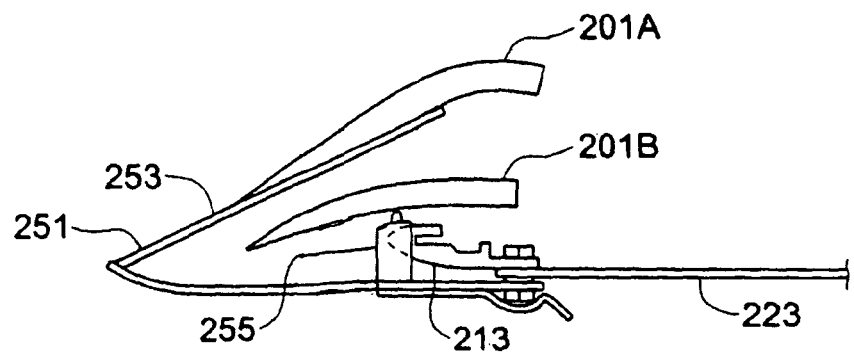
FIG. 9 is a schematic side view of an embodiment of a seed pan apparatus of the present invention mounted on a crop lifter of a common design.

FIG. 9 illustrates alternate embodiments of the seed pan apparatus 201A, 201B adapted to attach to a crop lifter 251 attached to a guard finger 213 on the cutting header 223. Seed pan apparatus 201A is attached by clamps, screws, or the like to the conventional lifting finger 253 of the crop lifter 251. Alternate seed pan apparatus 201B is attached to the hollow member 255 where the crop lifter 251 engages the guard finger 213, such that the apparatus 201B is located lower than the apparatus 201A.

Figure 10:
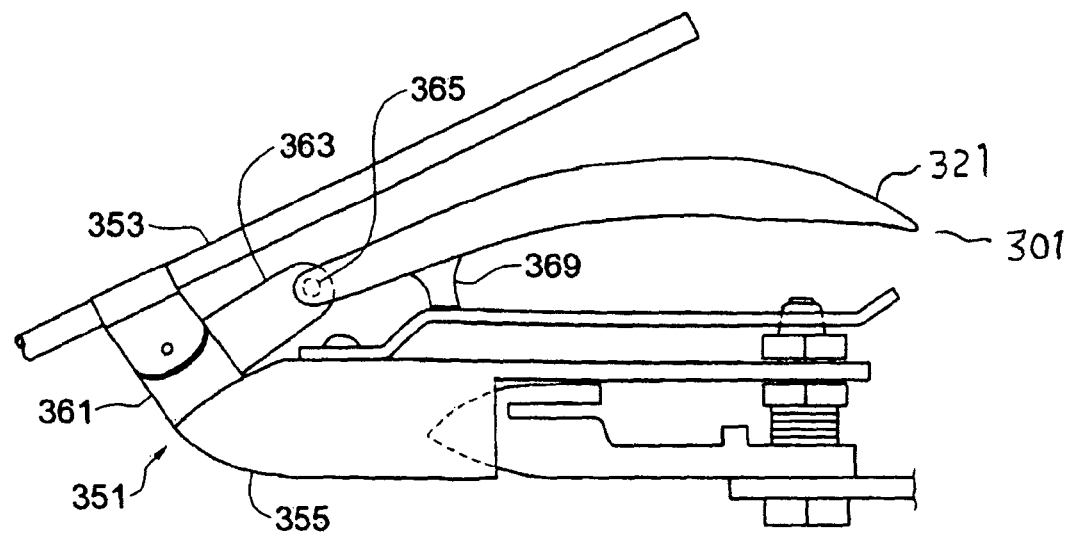
FIG. 10 is a schematic side view of an embodiment of a seed pan apparatus of the present invention mounted on a crop lifter of a different common design.
Figure 11:
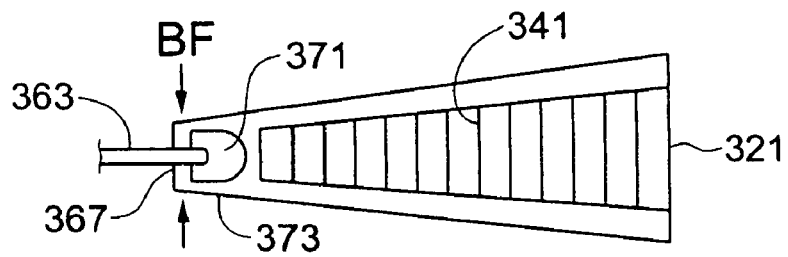
FIGS. 11 and 12 are top views of the embodiment of FIG. 10 showing installation on the crop lifter.
Figure 12:
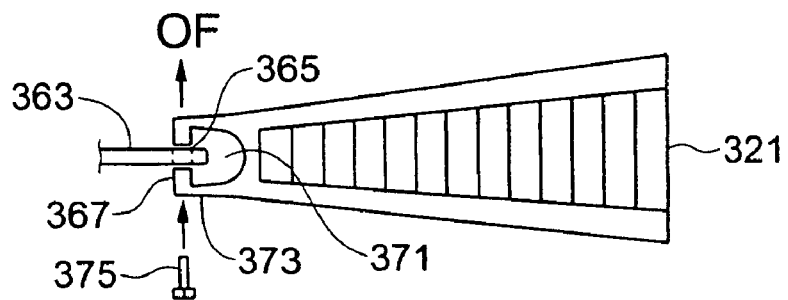

FIGS. 10-12 illustrate a further alternate seed pan apparatus 301 wherein the front end of the seed pan 321 is adapted to attach to a different style of crop lifter 351 that is attached to a guard finger. A finger plate 361 extends upward and somewhat forward from the hollow member 355 where the crop lifter 351 engages the guard finger, and the lifting finger 353 is attached to the finger plate 361.

In the illustrated embodiment, a pan plate 363 extends rearward as illustrated from the finger plate 361 of the crop lifter 351, and the pan plate 363 defines a lug aperture 365. The front end of the seed pan 321 includes a pair of lugs 367 biased toward by a bias force BF each other and configured such that the lugs 367 can be forced apart by exerting an opening force OF in the lugs, and then aligned with the lug aperture 365 and then released to engage the lugs 367 in the lug aperture 365 and thereby secure the seed pan apparatus 301 to the crop lifter 351. The illustrated seed pan apparatus 301 also includes a brace 369 between the crop lifter 351 and the bottom of the seed pan 321 to support the crop lifter 351 in the desired orientation. The illustrated seed pan 321 also includes steps 341 as described above to reduce the occurrence of seeds rolling down the incline of the seed pan 321.

The illustrated seed pan apparatus 301 is made from resilient plastic material. A hole 371 is defined in the front end of the seed pan 321 such that the lugs 367 are mounted on the end of resilient legs 373 which provide the required bias force BF. A hole could be made in the lugs 367 such that a bolt 375 could be passed through the lugs 367 and secured with a nut to ensure that the lugs 367 do not spread apart and disengage from the lug aperture 365. Alternatively the lugs 367 could be omitted and the seed pan apparatus 301 could be simply fastened with a bolt 375.

Figure 13:
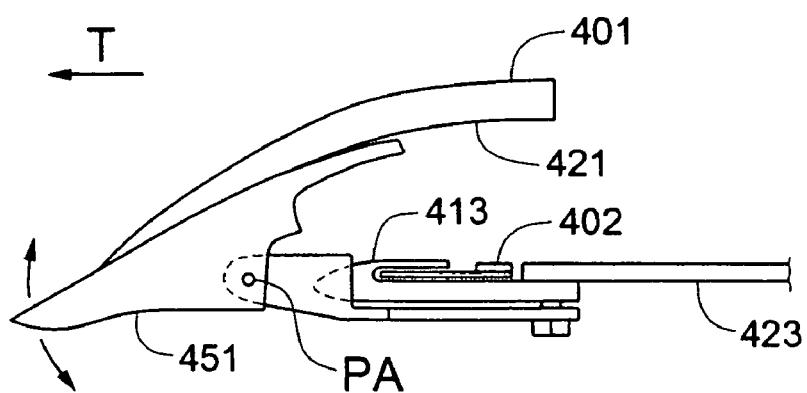
FIG. 13 is a schematic side view of an embodiment of a seed pan apparatus of the present invention mounted on a crop lifter of another different common design.

FIG. 13 illustrates a further alternate embodiment of the seed pan apparatus 401 for attachment to a crop lifter such as those made by Gatermann and as discussed above where the crop lifter 451 is attached to the header 423 via attachment to the guard finger 413 about a substantially horizontal pivot axis PA that is oriented substantially perpendicular to an operating travel direction T such that the crop lifter 451 can pivot about the pivot axis PA to follow the ground. When attached to the cutting header 423, the seed pan 421 extends upward and rearward from the guard finger 413 over the knife 402 to a rear end thereof located rearward of the knife 402. In the illustrated embodiment of FIG. 13, the front end of the seed pan 421, when attached to the cutting header 423, is forward of a front end of a guard finger 413.

Typically the seed pan apparatus of the present invention will be made from some relatively weak plastic material so that should same be broken or dislodged from the header it will not cause damage as it passes through the harvesting mechanism.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A seed pan apparatus for attachment to a cutting header having a knife and cooperating knife guards mounted along a lower front edge thereof, the knife guards including guard fingers extending forward from the knife, the seed pan apparatus comprising:

a seed pan adapted at a pointed front portion thereof for attachment to a guard finger such that the seed pan extends upward and rearward from a front portion of the seed pan forward of the guard finger over the guard finger and knife to a rear end thereof located rearward of the knife and above the knife;

side walls extending upward from side edges of the seed pan;

wherein the right and left side edges of the seed pan diverge from a front end thereof to the rear end thereof such that the rear end of the seed pan is wider than the front end thereof; and wherein the seed pan is configured such that when the seed pan is attached, side edges of the seed pan are located between the attached guard finger and a next adjacent guard finger on each side.

2. The apparatus of claim 1 wherein the guard fingers are spaced apart by a guard finger spacing and wherein the seed pan has a width at a widest portion thereof that is about the same as the guard finger spacing.

3. The apparatus of claim 1 wherein at least a front portion of the seed pan is oriented at an angle of at least 15 degrees above horizontal.

4. The apparatus of claim 1 wherein the seed pan is adapted to attach to the guard finger by attachment to a crop lifter attached to the guard finger.

5. The apparatus of claim 4 wherein the front end of the seed pan is adapted to attach to the guard finger about a substantially horizontal pivot axis, oriented substantially perpendicular to an operating travel direction.

6. The apparatus of claim 1 wherein the front end of the seed pan, when attached to the guard finger, is forward of a front end of a guard finger.

7. The apparatus of claim I wherein the side walls slope upward and outward from the side edges of the seed pan.

8. The apparatus of claim 1 wherein the seed pan comprises a plurality of steps, each step oriented substantially horizontally and perpendicular to an operating travel direction.

9. The apparatus of claim 1 wherein the seed pan is vertically curved from the front portion thereof to the rear end thereof.

10. A cutting header apparatus comprising:
- a knife and cooperating knife guards mounted along a lower front edge of a cutting header, the knife guards including guard fingers extending forward from the knife;
- a seed pan attached at a pointed front portion thereof to a guard finger such that the seed pan extends upward and rearward from a front portion of the seed pan forward of the guard finger over the guard finger and knife to a rear end thereof located rearward of the knife and above the knife;
- side walls extending upward from side edges of the seed pan;
- wherein right and left side edges of the seed pan diverge from a front end thereof to the rear end thereof such that the rear end of the seed pan is wider than the front end thereof; and
- wherein right and left side edges of the seed pan are located between the attached guard finger and corresponding next adjacent guard fingers on each side of the attached guard linger.

11. The apparatus of claim 10 wherein the guard fingers spaced apart by a guard finger spacing and wherein the seed pan has a width at a widest portion thereof that is about the same as the guard finger spacing.

12. The apparatus of claim 10 wherein at least a front portion of the seed pan is oriented at an angle of at least 15 degrees above horizontal.

13. The apparatus of claim 10 wherein the seed pan is attached to the guard finger by attachment to a crop lifter attached to the guard finger.

14. The apparatus of claim 10 comprising a plurality of seed pans attached to alternate guard fingers such that the knife can cut crop plants against the guard fingers to which the seed pans are attached under the attached seed pans, and can cut crop plants against guard fingers between the seed pans.

15. The apparatus of claim 10 wherein the seed pan is attached to the guard finger about a substantially horizontal pivot axis, oriented substantially perpendicular to an operating travel direction.

16. The apparatus of claim 10 wherein the side walls slope upward and outward from the side edges of the seed pan.

17. The apparatus of claim 10 wherein the seed pan comprises a plurality of steps, each step oriented substantially horizontally and perpendicular to an operating travel direction.

18. The apparatus of claim 10 wherein the seed pan is vertically curved from the front end thereof to the rear end thereof.

* * * * *